US012783504B2

(12) United States Patent
Moon et al.

(10) Patent No.: US 12,783,504 B2
(45) Date of Patent: Nov. 3, 2026

(54) BLOCKCHAIN SYSTEM USING STATE TRIE NODE AND MINING METHOD THEREOF

(71) Applicant: SEOUL NATIONAL UNIVERSITY R&DB FOUNDATION, Seoul (KR)

(72) Inventors: Soo Mook Moon, Seoul (KR); Jae Yun Kim, Seoul (KR); Jun Mo Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 19/264,112

(22) Filed: Jul. 9, 2025

(65) Prior Publication Data

US 2025/0335430 A1 Oct. 30, 2025

Related U.S. Application Data

(63) Continuation of application No. PCT/KR2024/002568, filed on Feb. 28, 2024.

(30) Foreign Application Priority Data

Feb. 28, 2023 (KR) ........................ 10-2023-0026856

(51) Int. Cl.
*G06F 16/23* (2019.01)
*H04L 9/00* (2022.01)

(52) U.S. Cl.
CPC ............ *G06F 16/2379* (2019.01); *H04L 9/50* (2022.05)

(58) Field of Classification Search
None
See application file for complete search history.

(56) References Cited

U.S. PATENT DOCUMENTS

2022/0006817 A1* 1/2022 Ren ..................... H04L 61/4511
2025/0335430 A1* 10/2025 Moon ................. H04L 67/1087
2025/0337603 A1* 10/2025 Moon ................. H04L 67/1087

FOREIGN PATENT DOCUMENTS

JP 2020-523677 A 8/2020
JP 2022-551874 A 12/2022
(Continued)

OTHER PUBLICATIONS

Ethanos: Efficient Bootstrapping for Full Nodes on Account-based Blockchain (Year: 2021).*
(Continued)

*Primary Examiner* — Kim T Nguyen
(74) *Attorney, Agent, or Firm* — Bridgeway IP Law Group, PLLC; Jihun Kim

(57) ABSTRACT

According to an embodiment, a mining method performed by node devices connected to a blockchain network, includes: acquiring, by a specific node device, a transaction including state change data for changing the state of a specific account and a first block including a first trie node related to specific state data of the blockchain network; generating, by the specific node device, a second block including a second trie node based on the transaction and the first trie node; and generating, by the specific node device, a nonce value for a second node corresponding to a state path from a specific leaf node corresponding to the specific account to a specific root node among one or more second nodes included in the second trie node, and determining whether a hash value derived based on the generated nonce value and the second node corresponding to the state path satisfies a predetermined criterion.

14 Claims, 7 Drawing Sheets

(56) References Cited

FOREIGN PATENT DOCUMENTS

| | | | |
|---|---|---|---|
| KR | 10-2016-0106570 | A | 9/2016 |
| KR | 10-2019-0097478 | A | 8/2019 |
| KR | 10-2020-0107662 | A | 9/2020 |
| KR | 10-2020-0107772 | A | 9/2020 |
| KR | 10-2022-0094899 | A | 7/2022 |
| WO | 2021/079224 | A1 | 4/2021 |

OTHER PUBLICATIONS

Examiner, "International Search Report of PCT/KR2024/002568" dated May 27, 2024, KIPO, Republic of Korea.

Kim, Jae Hun, "Ethereum World State Trie Analysis Tool. Master's thesis of engineering", Department of Electrical and Computer Engineering, Seoul National University Graduate School, Aug. 31, 2022, Republic of Korea.

* cited by examiner

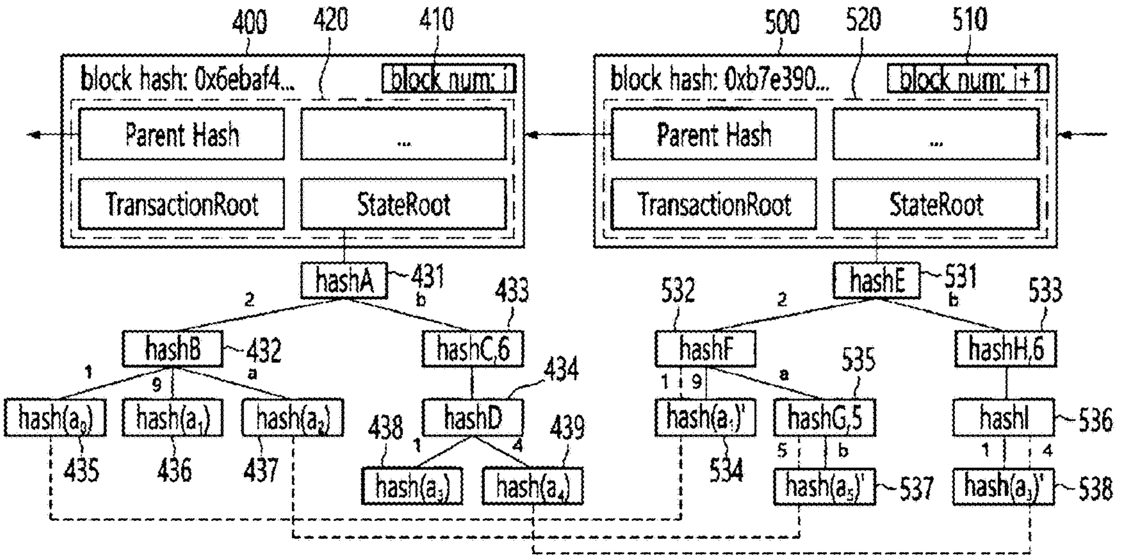

$\sigma_i$ 440

| account | hash(address) | balance | nonce | nonce |
|---|---|---|---|---|
| $a_0$ | 0x2165c3... | 32.01 ETH | 98 | |
| $a_1$ | 0x292f04... | 5.281 ETH | 31 | |
| $a_2$ | 0x2a553c... | 3.12 ETH | 27 | |
| $a_3$ | 0xb61b5a... | 0.2 ETH | 6 | |
| $a_4$ | 0xb64975... | 4.384 ETH | 12 | |

$\sigma_{i+1}$ 541 543 544 545 546

| account | hash(address) | balance | nonce | nonce |
|---|---|---|---|---|
| $a_0$ | 0x2165c3... | 32.01 ETH | 98 | |
| $a_1'$ | 0x292f04... | 5.281 ETH | 31 | |
| $a_2$ | 0x2a553c... | 3.12 ETH | 27 | |
| $a_3'$ | 0xb61b5a... | 0.2 ETH | 6 | |
| $a_4$ | 0xb64975... | 4.384 ETH | 12 | |
| $a_5$ | 0x2a5b71... | 9.28 ETH | 0 | |

$D_i$ 430

| key | value | nonce |
|---|---|---|
| hashA | {2: hashB, b: hashC} | 44 |
| hashB | {1: hash($a_0$), 9: hash($a_1$), hash($a_2$)} | 47 |
| hashC | {hashD, 6} | 99 |
| hashD | {1: hash($a_3$), 4: hash($a_4$)} | 919 |

$D_{i+1}$ 530

| key | value | nonce |
|---|---|---|
| ... | ... | |
| hashE | {2: hashF, b: hashG} | |
| hashF | {1: hash($a_0$), 9: hash($a_1$'), a: hashH} | |
| hashG | {5: hash($a_2$), b: hash($a_5$)} | |
| hashH | {hashI, 6} | |
| hashI | {1: hash($a_3$'), 4: hash($a_4$)} | |

FIG. 3

BLOCKCHAIN SYSTEM USING STATE TRIE NODE AND MINING METHOD THEREOF

CROSS-REFERENCE TO RELATED APPLICATION

This application is a continuation of PCT Patent Application No. PCT/KR2024/002568 filed on Feb. 28, 2024, which claims priority to Korean Patent Application No. 10-2023-0026856, filed on Feb. 28, 2023, in the Korean Intellectual Property Office, the disclosure of which is incorporated by reference herein in its entirety.

BACKGROUND

Technical Field

The present invention relates to a blockchain system using state trie nodes and a mining method thereof, and more particularly, to a blockchain system and a mining method using state trie nodes, in which a specific node device generates a second block based on a first block and a transaction, generates a nonce value for each of the second nodes—among one or more second nodes included in a second trie node of the second block—that have changed from the first block, and determines whether a hash value of each second node, derived based on the corresponding nonce value and the second node, satisfies a predefined criterion.

Blockchain is a technology that collects data into blocks and connects them in a chain using a peer-to-peer (P2P) approach. More specifically, blockchain is a technology in which servers are operated by users and data is distributed and stored to prevent attackers from arbitrarily altering the data. It uses hash functions and digital signatures to ensure the integrity and reliability of the data. Blockchain is currently applied in various fields such as smart contracts, cryptocurrencies, and identity authentication.

Account-based blockchains such as Ethereum store state data, which contains account data, in a blockchain state database using a data structure called a Merkle Patricia Trie. The trie node, which is a data structure of account-based blockchains, includes leaf nodes where accounts are stored, and intermediate nodes and a root node that contain path data used to navigate to the account address.

When a transaction is executed on a specific block in an account-based blockchain, a new block is created in which the trie nodes corresponding to the accounts affected by the transaction are modified. More specifically, in the new block, the leaf node corresponding to the account affected by the transaction in the specific block is changed, and the intermediate nodes and root node corresponding to the path of the modified account in the specific block are newly generated as part of the new trie node. The trie node in the new block sequentially calculates the hash values for each newly generated node—leaf node, intermediate node, and root node. The hash value of each node included in the trie node acts as a pointer within the trie structure. The newly generated nodes in the new block are stored in the state database using their respective hash values as keys. Since the nodes that were not changed in the new block are already stored in the state database, the account state can be tracked by accessing the trie node of the specific block, which is the previous block of the new block.

In this blockchain structure, the size of the state database storing the state data becomes extremely large, occupying the majority of the overall blockchain data. Therefore, when reading trie nodes from or storing new trie nodes in the state database to perform a transaction on a specific block, access to the state database must be made using random key values, which are hash values, resulting in significant performance degradation in the device performing the transaction.

The conventional proof-of-work consensus algorithm for account-based blockchains requires miners to find a nonce value such that the hash value of the block header, which includes a nonce field, satisfies a specific condition. By calculating a nonce value that causes the hash value of the newly generated block's header to meet the specified condition, miners are rewarded with the block. The stability of the blockchain is maintained by miners in the network calculating nonce values for proof of work. In blockchain, mining capability can be interpreted as having more chances to be the first to compute the required nonce value for proof of work. To aggregate mining capability, miners form mining pools. As the size of mining pools increases, the hash power for calculating nonce values within the blockchain network is also growing. When a mining pool's hash power exceeds 50% of the blockchain network, it could dominate the account-based blockchain network, hence a method to curb the hash power of mining pools is needed.

SUMMARY

The present invention aims to solve the aforementioned problems by providing a blockchain system using a state trie node and a mining method thereof, in which a specific node device generates a second block based on a first block and a transaction, generates a nonce value for each of the second nodes—among the one or more second nodes included in the second trie node of the second block—that were changed from the first block, and determines whether a hash value derived from the nonce value and the second node satisfies a predetermined criterion.

The technical problems to be achieved by the present invention are not limited to the aforementioned, and other technical problems may be derived from the following description of the invention.

As a technical means for solving the above-described technical problems, one aspect of the present invention provides a blockchain mining method using a state trie node. The method is a mining method performed by node devices connected to a blockchain network, and comprises: a step in which a specific node device obtains a first block including a first trie node related to specific state data of the blockchain network and a transaction including state change data for changing the state of a specific account; a step in which the specific node device generates a second block including a second trie node based on the transaction and the first trie node; and a step in which the specific node device generates a nonce value for a second node corresponding to a state path from a specific leaf node corresponding to the specific account to a specific root node, among one or more second nodes included in the second trie node, and determines whether a hash value derived from the generated nonce value and the second node corresponding to the state path satisfies a predetermined criterion.

In addition, as another technical means for solving the above-described technical problems, another aspect of the present invention provides a blockchain system using a state trie node. The system comprises at least one processor and a memory electrically connected to the processor, the memory storing at least one code to be executed by the processor. When executed by the processor, the code causes the processor to obtain a first block including a first trie node related to specific state data of a blockchain network and a transaction including state change data for changing the state of a specific account; generate a second block including a second trie node based on the transaction and the first trie node; and generate a nonce value for a second node corresponding to a state path from a specific leaf node corresponding to the specific account to a specific root node, among one or more second nodes included in the second trie node, and determine whether a hash value derived from the generated nonce value and the second node corresponding to the state path satisfies a predetermined criterion.

According to the problem-solving means of the present invention, unlike the conventional method in which a miner finds a nonce value such that the hash value of the block header of a newly generated block satisfies a specific condition, a miner must find a nonce value such that the hash value of each node, among one or more nodes included in the trie node of the newly generated block, that was changed by a transaction in the previous block satisfies a predetermined condition. This can enhance mining pool resistance.

In addition, according to the present invention, when a verification request is received from a light client for the account information of the light client and a specific block, verification is performed only on the leaf node corresponding to the light client's account and related nodes among the nodes changed by a transaction in the previous block. As a result, it becomes difficult to forge the light client's account.

Further, according to the present invention, by making the prefix of the hash value of each node, among one or more nodes included in the trie node of the newly generated block that was changed by a transaction in the previous block, match the block number of the newly generated block, the transaction synchronization speed can be improved.

BRIEF DESCRIPTION OF THE DRAWINGS

FIG. 3 is a diagram illustrating an example of performing a proof-of-work consensus algorithm through the blockchain system using a state trie node shown in FIG. 1.

DETAILED DESCRIPTION

Figure 1:
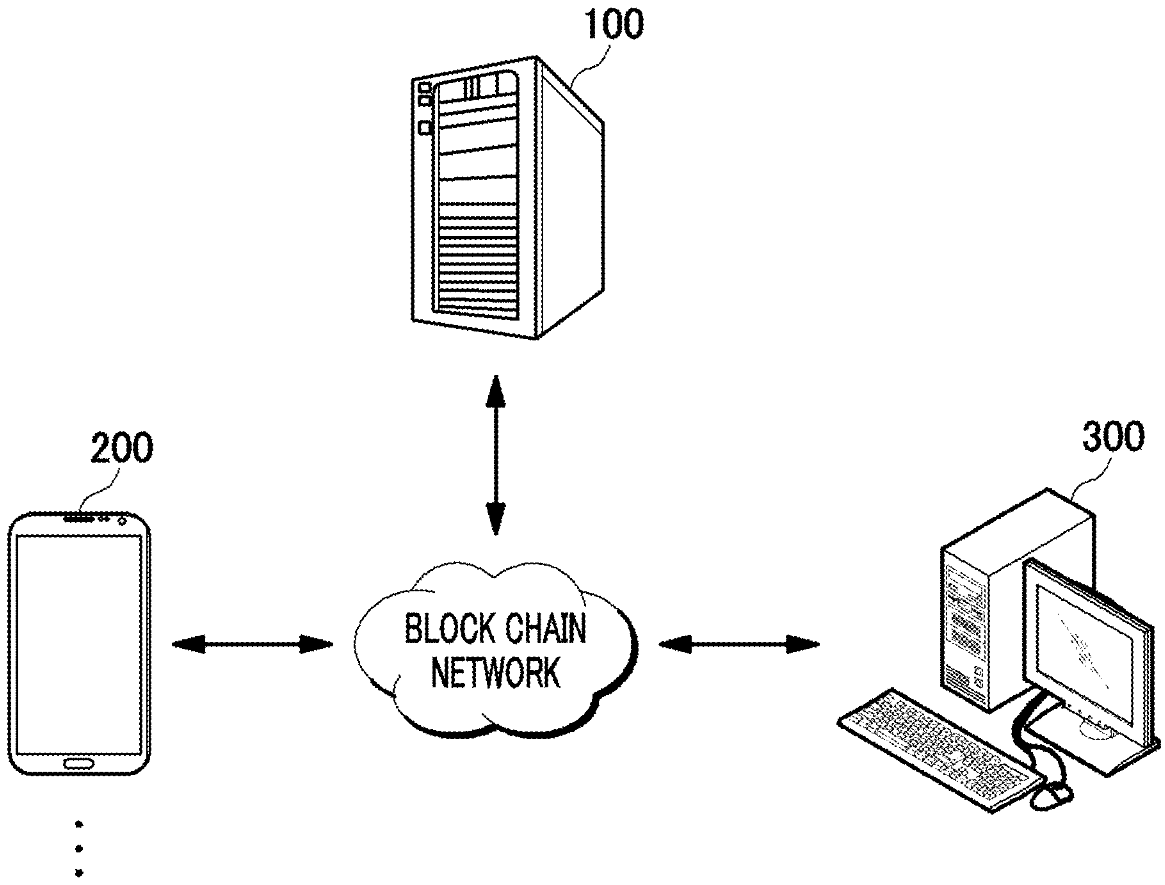
FIG. 1 is a diagram illustrating a blockchain system using a state trie node and node devices communicatively connected with a blockchain network according to an embodiment of the present invention.

Hereinafter, the present invention will be described in detail with reference to the accompanying drawings. However, the present invention may be implemented in various different forms and is not limited to the embodiments described herein. Additionally, the attached drawings are merely for facilitating understanding of the disclosed embodiments, and the technical spirit disclosed herein is not limited by the drawings. All terms including technical and scientific terms used herein should be interpreted in a manner commonly understood by those of ordinary skill in the art to which the present invention pertains. Predefined terms should also be interpreted as having meanings consistent with the related technical literature and the present disclosure, and unless otherwise defined, should not be interpreted as having excessively idealistic or restrictive meanings.

In order to clearly explain the present invention in the drawings, parts not related to the description have been omitted, and the size, shape, and configuration of each component shown in the drawings may be variously modified. Identical or similar parts throughout the specification are given identical or similar reference numerals.

The suffixes such as "module" and "unit" used for components in the following description are given or used interchangeably merely for ease of drafting the specification, and do not inherently indicate distinct meanings or roles. Additionally, in explaining the embodiments disclosed herein, detailed descriptions of related known technologies may be omitted if it is determined that such descriptions could obscure the gist of the embodiments disclosed in this specification.

Throughout the specification, when a part is described as being "connected (joined, contacted, or coupled)" to another part, this includes not only cases where they are "directly connected (joined, contacted, or coupled)," but also cases where they are "indirectly connected (joined, contacted, or coupled)" with another element interposed in between. Additionally, when a part is described as "including (comprising or providing)" a certain component, unless specifically stated otherwise, this does not exclude other components, and it means that other components may also be "included (comprised or provided)."

The terms such as "first," "second," etc., used in this specification to indicate ordinals are used solely to distinguish one component from another and do not imply any order or priority among components. For example, the "first component" of the present invention could be referred to as the "second component," and similarly, the "second component" could be referred to as the "first component." The singular forms used in this specification shall be interpreted to include plural forms as well, unless clearly stated otherwise.

The communication module described below may include hardware and software necessary to transmit and receive signals such as control signals or data signals through wired or wireless connections with other network devices. The memory may store at least one of the following: information and data input through the communication module, information and data necessary for functions performed by the processor, and data generated according to the execution of the processor. The memory should be interpreted as including both non-volatile storage devices that retain stored information even without power supply, and volatile storage devices that require power to maintain stored information. In addition to volatile storage devices that require power to maintain information, the memory may include magnetic storage media or flash storage media; however, the scope of the present invention is not limited thereto. The processor may include various types of devices for controlling and processing data. The processor may refer to a data processing device embedded in hardware that has physically structured circuits to perform functions expressed by codes or instructions included in a program. For example, the processor may be implemented in the form of a microprocessor, central processing unit (CPU), processor core, multiprocessor, application-specific integrated circuit (ASIC), or field programmable gate array (FPGA), but the scope of the present invention is not limited to these.

FIG. 1 is a diagram illustrating a blockchain system (hereinafter referred to as "blockchain system 100") using a state trie node according to an embodiment of the present invention, and node devices (200, 300) communicatively connected to a blockchain network.

Referring to FIG. 1, the blockchain system (100) is interconnected with a blockchain network via a wired or wireless communication network and may also be interconnected with node devices (200, 300) through the blockchain network. The blockchain system (100) may be implemented as a cloud computing server such as Software as a Service (SaaS), Platform as a Service (PaaS), or Infrastructure as a Service (IaaS). The blockchain system (100) may also be another node device. The configuration, functions, and operations of the blockchain system (100) described below may also be performed by the node devices (200, 300). The node devices (200, 300) may include, for example, all types of handheld wireless communication devices such as a notebook, desktop, laptop, wireless communication device or smartphone with portability and mobility, or a tablet PC including a touchpad, equipped with a web browser. The communication network may be implemented as any type of wired network such as a Local Area Network (LAN), Wide Area Network (WAN), or Value Added Network (VAN), or any type of wireless network such as a mobile radio communication network or satellite communication network.

The node devices (200, 300) may include a client node device (200) and a mining node device (300).

The client node device (200) includes a communication module, memory, input/output module, and processor. The communication module of the client node device (200) may perform data transmission and reception with the blockchain network. The memory of the client node device (200) stores a blockchain program. The name "blockchain program" is designated for convenience of explanation and does not limit the function of the program by its name alone. The memory of the client node device (200) may be configured to store at least one of the following: data input through the communication module, data necessary for functions executed by the processor, and data generated by execution of the processor.

The input/output module of the client node device (200) may receive information or data transmitted from the outside to the client node device (200), or output information or data held by the client node device (200) to the outside. For example, the input/output module may include a display, touchpad, speaker, and microphone.

The processor of the client node device (200) is configured to perform the following functions and procedures by executing the blockchain program stored in the memory. The processor may generate a transaction and transmit the generated transaction to the blockchain network. It may also transmit a proof request regarding the block generated by the transaction to the blockchain network.

The mining node device (300) may be a manager device of a mining pool or a miner node device of the mining pool. It includes a communication module, memory, input/output module, and processor. The communication module of the mining node device (300) may perform data transmission and reception with the blockchain network. The memory of the mining node device (300) stores a blockchain mining program. The name "blockchain mining program" is designated for convenience of explanation and does not limit the function of the program by its name alone. The memory of the mining node device (300) may be configured to store at least one of the following: data input through the communication module, data necessary for functions executed by the processor, and data generated by execution of the processor. The input/output module of the mining node device (300) may receive information or data transmitted from the outside to the mining node device (300), or output information or data held by the mining node device (300) to the outside. For example, the input/output module may include a display, touchpad, speaker, and microphone.

The processor of the mining node device (300) is configured to perform the following functions and procedures by executing the blockchain program stored in the memory. The processor of the mining node device (300) receives information about the new block generated by the transaction. The new block includes state data and the block itself, where the state data is stored in a trie node that includes one or more nodes. The processor of the mining node device (300) derives a nonce value such that the hash value of each of the one or more nodes in the newly generated trie node, which differ from the trie node of the previous block, satisfies a predefined condition. The processor transmits the nonce value for the newly generated block to the blockchain network to receive a reward.

Figure 2:
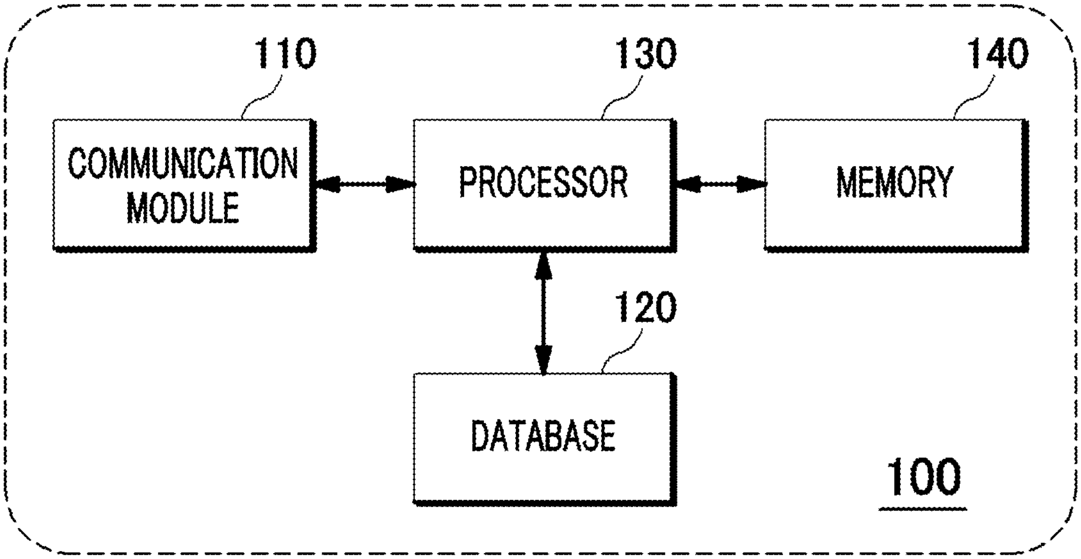
FIG. 2 is a block diagram showing the configuration of the blockchain system using a state trie node illustrated in FIG. 1.

FIG. 2 is a block diagram illustrating the configuration of the blockchain system (100), and FIG. 3 shows an example of performing a proof-of-work consensus algorithm using the blockchain system (100).

Referring to FIGS. 2 and 3 together, the blockchain system (100) includes at least one processor (130) and memory (140), and may further include a communication module (110) and a database (120).

The communication module (110) performs transmission and reception of information with external devices or servers and can send and receive data necessary to execute the proof-of-work consensus algorithm using the state trie node.

The database (120) may be a place where data required for performing the proof-of-work consensus algorithm using the state trie node is stored. The database (120) may be built within a portion of the memory (140) or implemented as separate hardware.

The processor (130) performs operations according to the code stored in the memory (140).

The memory (140) is electrically connected to the processor (130) and stores at least one code executed by the processor (130). When executed via the processor (130), the memory (140) stores code that causes the processor (130) to perform the following functions and procedures.

The memory (140) stores code that causes the acquisition of a first block (400) including a first trie node (430) related to specific state data of the blockchain network and a transaction. The transaction corresponds to data and information used to change or update the state of the trie node included in the tree structure. The tree structure may be a Merkle Patricia Trie data structure. The transaction includes state change data for modifying the state of a specific account. The state change data includes the address of the specific account and the transaction count. The transaction may be acquired from the blockchain mempool. This transaction is a new one not included in the first block.

The memory (140) stores code that causes the generation of a second block (500) including a second trie node (530) based on the transaction and the first trie node (430). The memory (140) performs the transaction to generate the second block (500) and stores in the second block (500) the second trie node (530) and a transaction list including one or more executed transactions. The memory (140) can generate the second trie node (530) created by the transaction based on the first trie node (430) of the first block. More specifically, the memory (140) stores code that causes the retrieval of the first node corresponding to the state path—from the specific leaf node corresponding to the account to be changed based on the state change data of the transaction to the specific root node—among the first nodes (431 to 439) included in the first trie node (430) of the first block (400). The memory (140) stores code that causes the generation of a second node corresponding to the state path, based on the first node corresponding to the state path using the state change data and the state path. More specifically, the memory (140) stores code that either: (i) generates account information for the leaf node corresponding to the specific account to be changed in the state change data based on the first node corresponding to the state path; or (ii) if there is no such leaf node among the first nodes corresponding to the state path, generates a leaf node for the specific account along the state path based on the state change data. The memory (140) stores code that causes the retrieval of sibling nodes for the second node corresponding to the state path. A sibling node is a node that shares the same parent node as the second node corresponding to the state path. More specifically, the memory (140) stores code that causes the retrieval of modified sibling nodes among the sibling nodes of the second node corresponding to the state path. For example, the sibling node of the leaf node (537) is the leaf node (437), and the sibling nodes of the intermediate node (535) are the leaf node (435) and the leaf node (534). The memory (140) stores code that causes the association of the retrieved sibling nodes and the second node corresponding to the state path to generate the second trie node (530).

For example, if the state path—from the specific leaf node corresponding to the account to be changed according to the transaction's state change data to the specific root node—includes the path from the root node (431) containing hash A to the leaf node (436) containing hash(a1), and the path from the root node (431) containing hash A to the leaf node (438) containing hash(a3), then the path from the root node (431) to the leaf node (436) is "/2/9", and the path from the root node (431) to the leaf node (438) is "/b/6/1". Accordingly, the first nodes corresponding to the state path are the root node (431) with hash A, the intermediate node (432) with hash B, the leaf node (436), the intermediate node (433) with hash C, the intermediate node (434) with hash D, and the leaf node (438). Among the first nodes corresponding to the state path, the leaf nodes (436, 438) are modified by the transaction's state change data, resulting in the generation of leaf nodes (534, 538). If the transaction's state change data results in the generation of a specific leaf node (537), and the state path is '2/a/5/b' corresponding to the specific leaf node (537), and if there is no corresponding leaf node for the specific leaf node (537) among the first nodes, then the specific leaf node (537) may be added to the first nodes to be generated. The newly generated nodes in the second block (500) are stored in the blockchain state database, while the unchanged existing nodes remain in the state database. Therefore, the first trie node (430) in the previous block (400) of the second block (500) remains accessible.

The first nodes (431 to 439) included in the first block (400) and the second nodes (435, 437, 439, 531 to 538) included in the second block comprise at least one of root nodes (431, 531), intermediate nodes (432, 433, 434, 532, 533, 535, 536), and leaf nodes (435, 436, 437, 438, 439, 537, 538). A root node is associated with intermediate nodes and child nodes, or with leaf nodes and child nodes. For example, the child nodes of root node (431), whose hash value is hash A, are intermediate node (432) with hash value hash B and intermediate node (433) with hash value hash C. An intermediate node may be associated with other intermediate nodes and child nodes, or with leaf nodes and child nodes. For example, the child nodes of intermediate node (532) with hash value hash F are leaf node (435) with hash value hash(a0), leaf node (534) with hash value hash(a1), and intermediate node (535) with hash value hash G. A root node or an intermediate node includes path data for child nodes, a nonce field where a nonce value is input, and a hash value. For example, root node (431) with hash value Hash A includes path data like {2:hash B, b:hash C}, a nonce field, and a hash value. A leaf node includes account information such as an account (541), an address (543), a balance (544), a transaction count (545), a nonce field (546) for inputting a nonce value, and a hash value. If the account is a smart contract, the hash value of the leaf node is stored in a field (codeHash) for the hash value of the code. If the account is a smart contract, the leaf node further includes a field (storageRoot) for storing the storage trie. The hash value of an intermediate node is calculated based on the hash values of each associated child node according to the intermediate node's path data and the nonce value input in the intermediate node's nonce field. The hash value of a root node is calculated based on the hash values of each associated child node according to the root node's path data and the nonce value input in the root node's nonce field. The hash value of a leaf node is calculated based on the account information of the leaf node and the nonce value input in the leaf node's nonce field.

Memory (140) stores code that causes a nonce value to be generated for the second node corresponding to the state path from a specific leaf node to a specific root node among one or more second nodes included in the second trie node (530), the specific leaf node corresponding to a specific account altered by the transaction's state change data. It also stores code that causes a determination of whether a hash value, derived based on the generated nonce and the second node corresponding to the state path, satisfies a predetermined criterion. Specifically, memory (140) may generate the nonce value for the second node corresponding to the state path and insert it into the nonce field of the second node, then derive the hash value. More specifically, memory (140) stores code that generates a nonce value for a first leaf node included among the second nodes, and causes a judgment as to whether the hash value derived based on the nonce value and the account information of the first leaf node satisfies the predetermined criterion. The first leaf node may include a plurality of leaf nodes (534, 537, 538), and the hash value of the first leaf node refers to each hash value of the plurality of leaf nodes. If the hash value of the first leaf node satisfies the predetermined criterion, memory (140) stores code that generates a nonce value for a first parent node associated with the first leaf node, and causes a judgment as to whether the hash value of the first parent node, derived based on the nonce and the hash values of its associated child nodes, satisfies the predetermined criterion. If the hash value of the first parent node satisfies the criterion and a second parent node associated with the first parent node exists, memory (140) stores code that causes a nonce value to be generated for the second parent node and causes a judgment as to whether the hash value of the second parent node, derived based on its nonce and the hash values of associated child nodes, satisfies the predetermined criterion. The first and second parent nodes may be intermediate nodes or root nodes among the second nodes. If either is a root node, memory (140) stores code that, when the hash value of the root node satisfies the criterion, causes the derivation of a state root hash included in the block header of the second block (500) based on the root node's hash. The first block (400) and second block (500) further include block numbers (410, 510). The block number (510) of the second block (500) has a greater value than that of the first block (400). The predetermined criterion may be one that requires the hash value to be smaller than a target value based on a preset difficulty. Additionally, the criterion may include that the prefix of the hash value matches the block number of the newly generated second block (500) created by a transaction in the previous block (first block (400)).

Memory (140) stores code that, when the hash value of the second node corresponding to the state path satisfies the predetermined criterion, causes the second block (500) to be transmitted to the blockchain network.

Memory (140) also stores code that, when a proof request for the second block (500) is received from node device(s) (200, 300) or another node device, causes verification of whether the hash values of each of the second nodes in the second block (500) satisfy the predetermined criterion. As each of the second nodes can be verified in parallel, verification overhead can be reduced.

If the node devices (200, 300) or the other node device are light client node devices, and a verification request for the second block (500) along with account information from a light client is received, memory (140) stores code that causes verification of whether the hash value of a leaf node corresponding to the account information and the hash values of one or more nodes including the path data for the leaf node satisfy the predetermined criterion. This allows for reduced verification overhead while maintaining verification validity, particularly useful in cases where the verifier is a light client with limited resources or a smart contract of another blockchain for compatibility. For example, if a specific block changes 200 accounts and thereby creates a new trie node with 1300 new nodes, the light client does not need to verify all 1300 nodes. Instead, it can verify only 2 leaf nodes corresponding to its account information and 18 other nodes (including at least one intermediate or root node) that make up the path to those leaf nodes.

Figure 4:
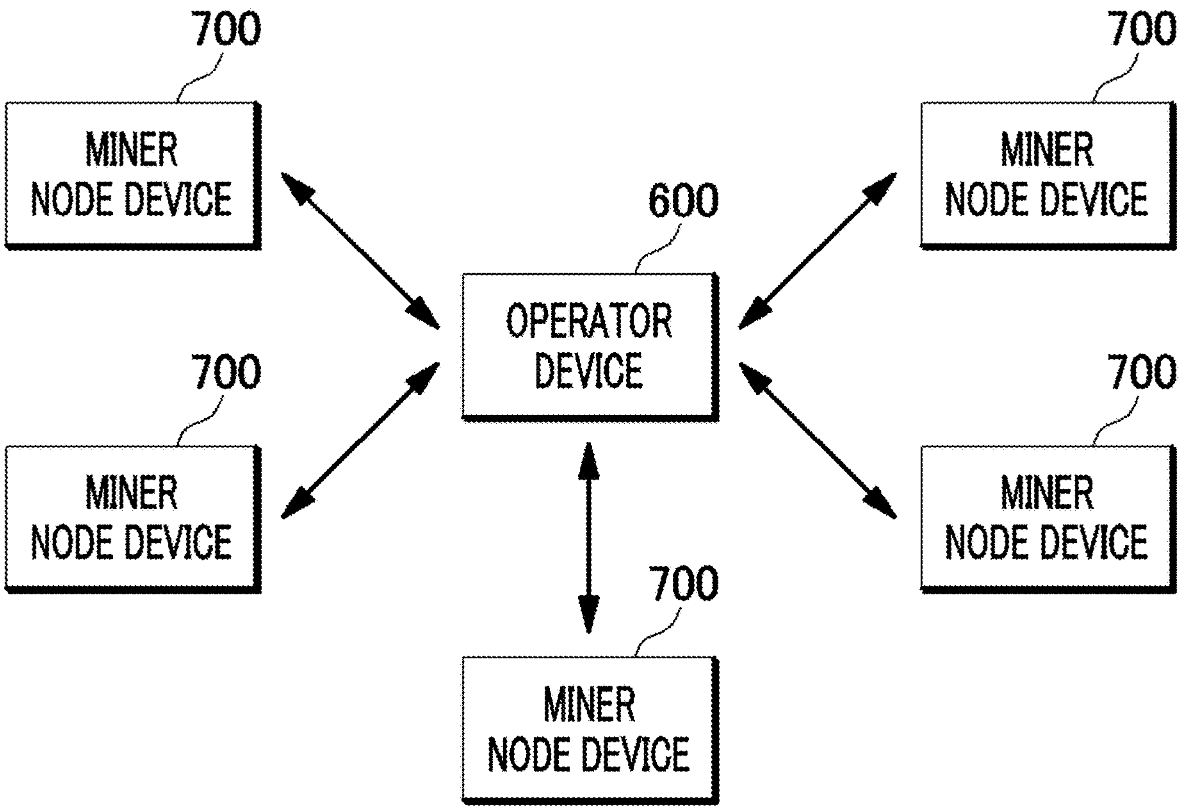
FIG. 4 is a diagram illustrating an example of a mining pool.

FIG. 4 illustrates an example of a mining pool.

Referring to FIG. 4, the mining pool includes an operator device (600) and a plurality of miner node devices (700). The operator device (600) is communicatively connected to the blockchain network, while the plurality of miner node devices (700) are communicatively connected to the operator device (600). In the conventional system, the operator device (600) delivers the block header of the block to be mined to the plurality of miner node devices (700). When the operator device (600) receives, from one of the miner node devices (700), a nonce value such that the hash value of the block header satisfies a certain difficulty criterion (i.e., is smaller than a threshold hash value), it instructs all miner node devices (700) to stop nonce calculation and distributes rewards to them based on their contribution.

Meanwhile, in the state trie node proof-of-work consensus algorithm of the present invention, when a block is generated by a transaction, the nonce value must be calculated such that the hash value of each of the nodes changed from the previous block—stored as a trie node containing one or more nodes—satisfies a predetermined criterion. This algorithm also enforces that each of the miner node devices (700) holds parts of the blockchain block header and the state trie data, thereby enhancing network security. For example, to mine a current block including a trie node with 1,000 changed nodes from the previous block, network communication between the operator device (600) and the plurality of miner node devices (700) must occur 1,000 times. Through this, the blockchain system (100) increases the network overhead, bandwidth usage, computational load, and network usage of the miner node devices (700), thereby reducing the efficiency of the mining pool—i.e., providing resistance against mining pools.

Figure 5:
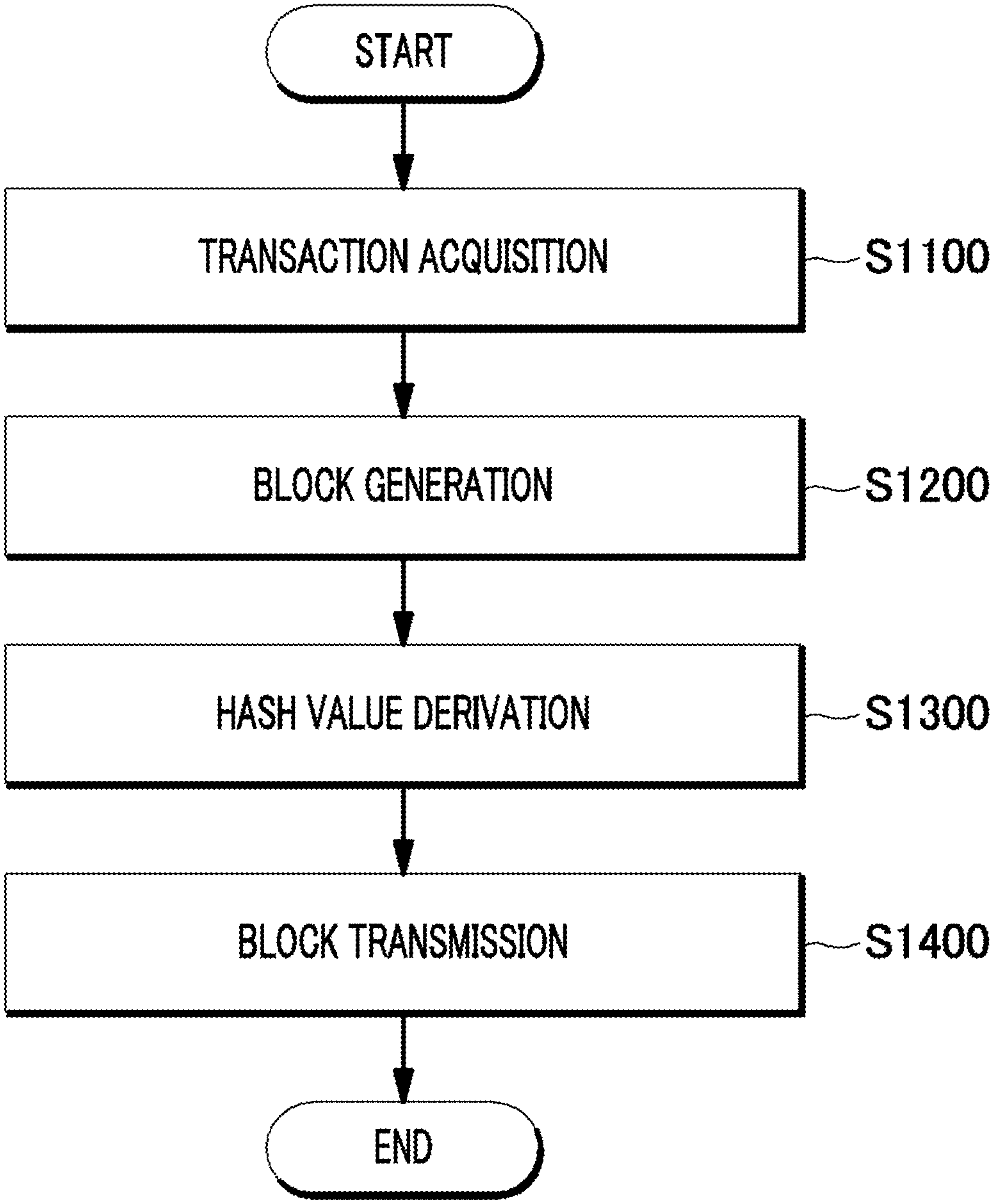
FIG. 5 is a flowchart explaining a blockchain mining method using a state trie node according to another embodiment of the present invention.
Figure 6:
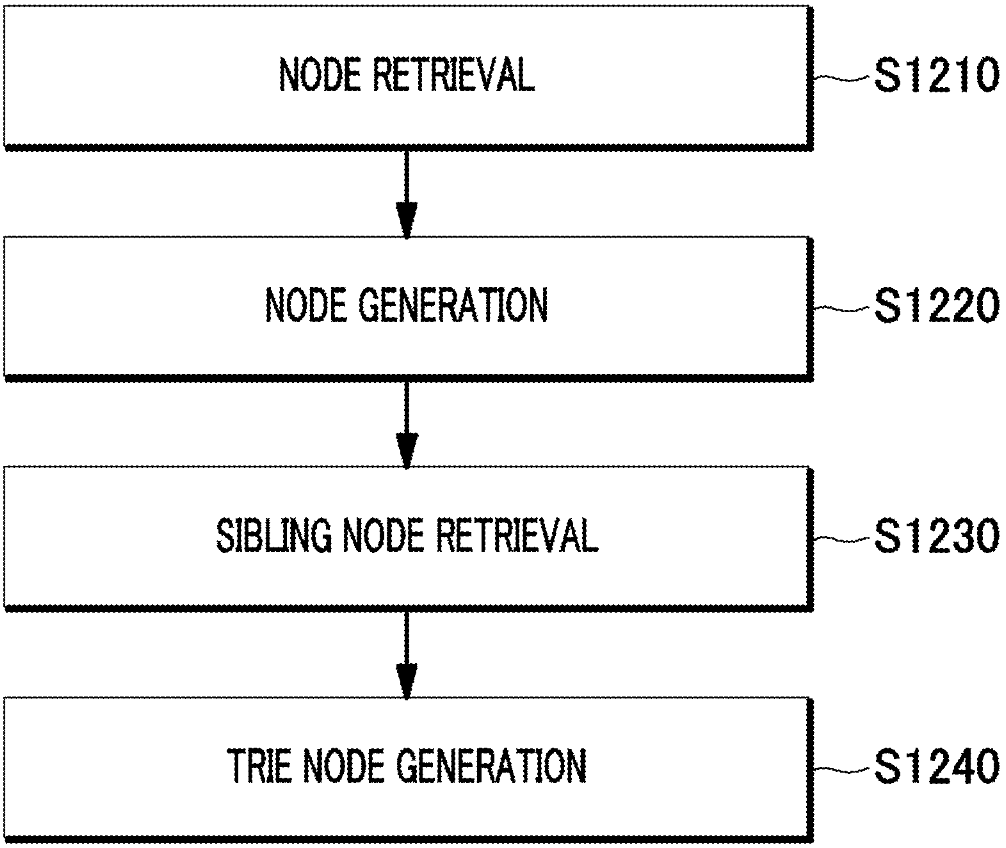
FIGS. 6 to 8 are flowcharts illustrating detailed steps included in the steps of the blockchain mining method using a state trie node shown in FIG. 5.
Figure 7:
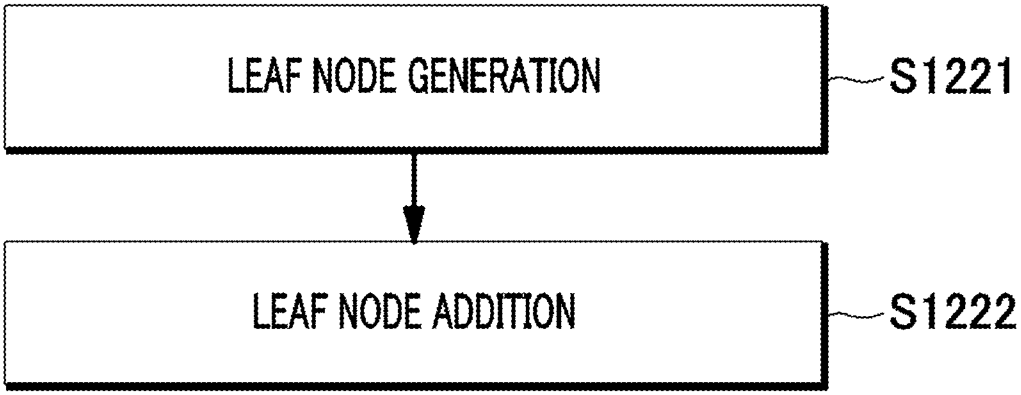
Figure 8:
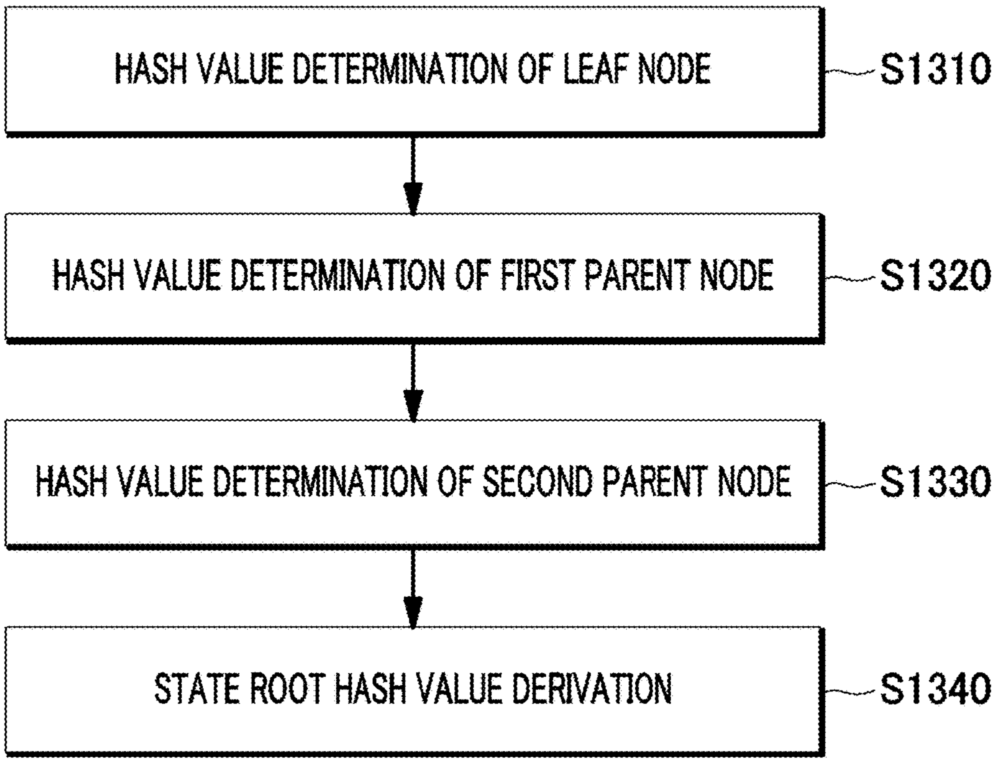
Figure 9:
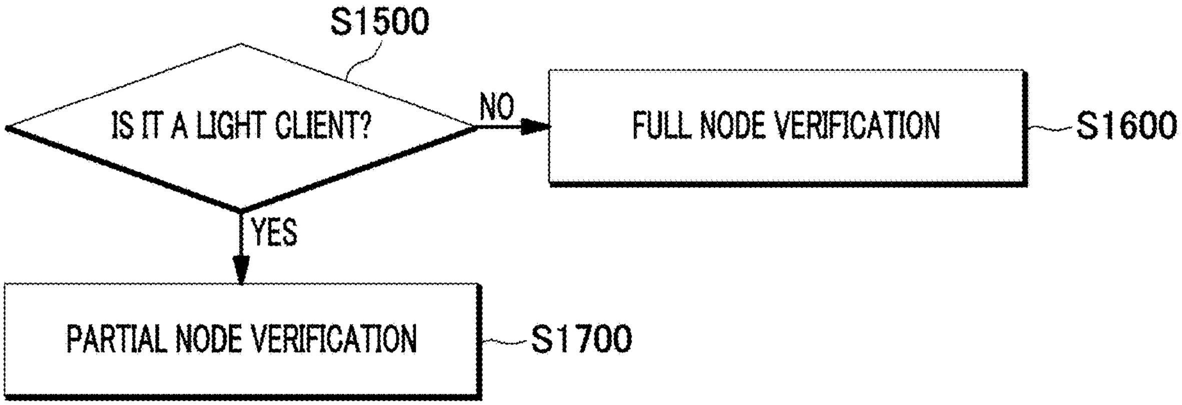
FIG. 9 is a flowchart illustrating additional steps of the blockchain mining method using a state trie node shown in FIG. 5.

FIG. 5 is a flowchart illustrating a blockchain mining method using a state trie node according to another embodiment of the present invention. FIGS. 6 to 8 are flowcharts illustrating detailed steps included in the steps of the blockchain mining method using the state trie node, and FIG. 9 is a flowchart illustrating additional steps of the blockchain mining method using the state trie node. Hereinafter, with reference to FIGS. 5 to 9, the blockchain mining method using the state trie node will be described. Each step of the blockchain mining method using the state trie node to be described below may be performed by the blockchain system (100) using the state trie node as described with reference to FIGS. 1 to 4. Accordingly, the contents described in the embodiment of the present invention with reference to FIGS. 1 to 4 may also be applied to the embodiment to be described below, and overlapping descriptions with the above will be omitted below. The steps described below are not necessarily performed in order, and the order of the steps may be set in various ways, and the steps may be performed almost simultaneously.

Referring to FIG. 5, the blockchain mining method using the state trie node is a mining method performed by node devices connected to a blockchain network, and may include a transaction acquisition step (S1100), a block generation step (S1200), and a hash value derivation step (S1300), and may further include a block transmission step (S1400).

In the transaction acquisition step (S1100), a specific node device acquires a first block including a first trie node regarding specific state data of the blockchain network and a transaction including state change data for changing a state of a specific account. The state change data may include an address and a transaction count of the specific account.

In the block generation step (S1200), a specific node device generates a second block including a second trie node based on the transaction and the first trie node. The first node included in the first block and the second node included in the second block include at least one of a root node, an intermediate node, and a leaf node. The root node is associated with an intermediate node and a child node, or with a leaf node and a child node. The intermediate node is associated with another intermediate node and a child node, or with a leaf node and a child node. The root node and the intermediate node include path data for the child node, a nonce field into which a nonce value is input, and a hash value. The leaf node includes account information including an account, an address, a balance, and the number of transactions, a nonce field into which a nonce value is input, and a hash value. The hash value of the intermediate node is derived based on the hash values of each of one or more child nodes associated according to the path data of the intermediate node and the nonce value input into the nonce field of the intermediate node. The hash value of the root node is derived based on the hash values of each of one or more child nodes associated according to the path data of the root node and the nonce value input into the nonce field of the root node. The hash value of the leaf node is derived based on the account information and the nonce value input into the nonce field of the leaf node.

The hash value derivation step (S1300) is a step in which a specific node device generates a nonce value for a second node corresponding to a state path from a specific leaf node corresponding to a specific account to be changed through the state change data of a transaction among one or more second nodes included in the second trie node, and determines whether a hash value derived based on the generated nonce value and the second node corresponding to the state path satisfies a predetermined criterion. The first block and the second block further include block numbers. The block number of the second block has a greater value than the block number of the first block. The predetermined criterion may be a criterion that the hash value is smaller than a hash value satisfying a predetermined difficulty level. The predetermined criterion may further include a condition that a prefix of the hash value is identical to the block number of the second block.

The block transmission step (S1400) is a step in which a specific node device transmits the second block to the blockchain network when the hash value of the second node corresponding to the state path satisfies the predetermined criterion.

Referring to FIG. 6, the block generation step (S1200) includes a node retrieval step (S1210), a node generation step (S1220), a sibling node retrieval step (S1230), and a trie node generation step (S1240).

The node retrieval step (S1210) is a step in which a specific node device retrieves a first node corresponding to a state path from a specific leaf node corresponding to a specific account to be changed through the state change data of a transaction among the first nodes included in the first trie node. The node generation step (S1220) is a step in which the specific node device generates a second node corresponding to the state path based on the first node corresponding to the state path using the state change data and the state path. The sibling node retrieval step (S1230) is a step in which the specific node device retrieves a sibling node of the second node corresponding to the state path. The trie node generation step (S1240) is a step in which the specific node device generates the second trie node by associating the retrieved sibling node with the second node corresponding to the state path. In the second trie node, the retrieved sibling node is a second node not corresponding to the state path.

Referring to FIG. 7, the node generation step (S1220) includes a leaf node generation step (S1221) and a leaf node addition step (S1222).

The leaf node generation step (S1221) is a step in which a specific node device generates account information of a leaf node corresponding to a specific leaf node of the state change data from the first node corresponding to the state path. The leaf node addition step (S1222) is a step in which, when there is no leaf node corresponding to a specific leaf node of the state change data in the first node corresponding to the state path, the specific node device additionally generates the specific leaf node along the state path.

Referring to FIG. 8, the hash value derivation step (S1300) includes a step of determining the hash value of the leaf node (S1310), a step of determining the hash value of a first parent node (S1320), a step of determining the hash value of a second parent node (S1330), and a step of deriving a state root hash value (S1340).

The step of determining the hash value of the leaf node (S1310) is a step in which a specific node device generates a nonce value for a first leaf node, which is a leaf node included in the second nodes, and determines whether the hash value of the first leaf node, derived based on the nonce value and the account information of the first leaf node, satisfies a predetermined condition.

The step of determining the hash value of the first parent node (S1320) is a step in which, if the hash value of the first leaf node satisfies the predetermined condition, the specific node device generates a nonce value for the first parent node associated with the first leaf node, and determines whether the hash value of the first parent node, derived based on the nonce value and the hash values of one or more child nodes associated with the first parent node, satisfies the predetermined condition.

The step of determining the hash value of a second parent node (S1330) is a step in which, if the hash value of the first parent node satisfies a predetermined condition and a second parent node associated with the first parent node exists, the specific node device generates a nonce value for the second parent node, and determines whether the hash value of the second parent node, derived based on the nonce value and the hash values of one or more child nodes associated with the second parent node, satisfies the predetermined condition.

The step of deriving the state root hash value (S1340) is a step in which, when the first parent node and the second parent node are intermediate nodes included in the second nodes or root nodes included in the second nodes, and when either the first parent node or the second parent node is a root node included in the second nodes, if the hash value of the root node included in the second nodes satisfies the predetermined condition, the specific node device derives the hash value for the state root included in the block header of the second block based on the hash value of the root node included in the second nodes.

Referring to FIG. 9, after the block transmission step (S1400), the method further includes a client confirmation step (S1500), a full node verification step (S1600), and a partial node verification step (S1700).

The client confirmation step (S1500) is a step in which, upon receiving a proof request for the second block from a specific node device and another node device among the node devices, it is determined whether the specific node device and the other node device are node devices of a light client.

The full node verification step (S1600) is a step in which, when the specific node device and the other node device among the node devices are not node devices of a light client, it is verified whether the hash value of the second node corresponding to the first state path of the second block satisfies a predetermined condition.

The partial node verification step (S1700) is a step performed when the node device and the other node device are node devices of a light client, and a verification request for the second block and account information of the light client is received from the light client's node device. The partial node verification step (S1700) is a step in which it is verified whether the hash value of the leaf node corresponding to the account information of the light client among the second nodes of the second block and the hash values of one or more nodes including path data for the corresponding leaf node satisfy the predetermined condition.

The blockchain mining method using a state trie node according to the embodiments of the present invention described above may also be implemented in the form of a recording medium including computer-executable instructions, such as program modules executed by a computer. A computer-readable medium may be any available medium that can be accessed by a computer and includes both volatile and non-volatile media, and removable and non-removable media. The computer-readable medium may include computer storage media. The computer storage media include both volatile and non-volatile, and removable and non-removable media implemented in any method or technology for storage of information such as computer-readable instructions, data structures, program modules, or other data.

It will be understood by those skilled in the art that various modifications can be made to the present invention without departing from the spirit or essential characteristics thereof based on the above description. Therefore, the above-described embodiments are illustrative in all aspects and should not be construed as limiting. The scope of the present invention is defined by the claims described below, and all modifications or variations derived from the meaning, scope, and equivalents of the claims should be interpreted as being included within the scope of the present invention.

What is claimed is:

1. A blockchain mining method performed by node devices connected to a blockchain network, the method comprising:

a) acquiring, by a specific node device, a first block including a first trie node related to specific state data of the blockchain network and a transaction including state change data for changing a state of a specific account;

b) generating, by the specific node device, a second block including a second trie node based on the transaction and the first trie node; and c) generating, by the specific node device, a nonce value of a second node corresponding to a state path from a specific leaf node corresponding to the specific account to a specific root node among one or more second nodes included in the second trie node, and determining whether a hash value derived based on the nonce value of the second node and the second node corresponding to the state path satisfies a predetermined criterion, wherein the method is a blockchain mining method using a state trie node, wherein the step c) comprises:

generating, by the specific node device, a nonce value of a first leaf node included in the one or more second nodes corresponding to the state path, and determining whether a hash value of the first leaf node derived based on the nonce value of the first leaf node and first account information of the first leaf node satisfies the predetermined criterion;

if the hash value of the first leaf node satisfies the predetermined criterion, generating, by the specific node device, a nonce value of a first parent node associated with the first leaf node, and determining whether a hash value of the first parent node derived based on the nonce value of the first parent node and hash values of one or more child nodes associated with the first parent node satisfies the predetermined criterion;

and if the hash value of the first parent node satisfies the predetermined criterion and a second parent node associated with the first parent node exists, generating, by the specific node device, a nonce value of the second parent node, and determining whether a hash value of the second parent node derived based on the nonce value of the second parent node and hash values of one or more child nodes associated with the second parent node satisfies the predetermined criterion.

2. The blockchain mining method using the state trie node according to claim 1, wherein a first node included in the first block and the second node included in the second block each includes a root node, an intermediate node, or a leaf node, wherein the root node is associated with a child node and either the intermediate node or the leaf node, wherein the intermediate node is associated with the child node and either another intermediate node or the leaf node, wherein the root node and the intermediate node each include path data for an associated child node, a nonce field of the root node or the intermediate node into which a nonce value of the root node or the intermediate node is input, and a hash value of the root node or the intermediate node, wherein the leaf node includes account information comprising an account, an address, a balance, and a transaction count, a nonce field of the leaf node into which a nonce value of the leaf node is input, and a hash value of the leaf node, wherein the hash value of the intermediate node is derived based on the hash values of the one or more child nodes associated according to path data of the intermediate node and the nonce value of the intermediate node input into the nonce field of the intermediate node, wherein the hash value of the root node is derived based on the hash values of the one or more child nodes associated according to path data of the root node and the nonce value of the root node input into the nonce field of the root node, wherein the hash value of the leaf node is derived based on the account information and the nonce value input into the nonce field of the leaf node, wherein the state change data is data of the specific leaf node including the account information, address, and transaction count for the specific account, and wherein the state path is path data from a specific root node to the specific leaf node.

3. The blockchain mining method using a state trie node according to claim 2, further comprising:

d) transmitting, by the specific node device, the second block to the blockchain network when a hash value of the second node corresponding to the state path satisfies the predetermined criterion.

4. The blockchain mining method using a state trie node according to claim 3, further comprising:

e) upon receiving, by the specific node device, a proof request for the second block from another node device among the node devices, verifying whether the hash value of the second node corresponding to the state path of the second block satisfies the predetermined criterion.

5. The blockchain mining method using a state trie node according to claim 4, wherein the specific node device and the other node device are light client node devices, wherein step e) comprises:

upon receiving, by the specific node device from the other light client node device, account information of the other light client node device and a proof request for the second block, and verifying by the specific node device whether the hash value of a leaf node corresponding to the account information among the second nodes of the second block and the hash value of one or more nodes including path data for the corresponding leaf node satisfy the predetermined criterion.

6. The blockchain mining method using a state trie node according to claim 2, wherein the step b) comprises:

b-1) retrieving, by the specific node device, a first node corresponding to the state path among the first nodes included in the first trie node;

b-2) generating, by the specific node device, a second node corresponding to the state path based on the first node corresponding to the state path using the state change data and the state path;

b-3) retrieving, by the specific node device, a sibling node of the second node corresponding to the state path; and b-4) associating, by the specific node device, the retrieved sibling node with the second node corresponding to the state path to generate the second trie node.

7. The blockchain mining method using a state trie node according to claim 6, wherein the step b-2) comprises:

generating, by the specific node device, account information of a leaf node corresponding to the specific account from the first node corresponding to the state path based on the state change data; and when no leaf node corresponding to the specific account exists in the first node corresponding to the state path, generating by the specific node device a leaf node for the specific account in the first node according to the state path based on the state change data.

8. The blockchain mining method using a state trie node according to claim 1, wherein the first parent node and the second parent node are intermediate nodes or root nodes included in the second nodes, and if the first parent node or the second parent node is the root node included in the second nodes, the method further comprises:

deriving, by the specific node device, a hash value for a state root included in a block header of the second block, based on the hash value of the root node included in the second nodes, when the hash value of the root node satisfies the predetermined criterion.

9. The blockchain mining method using a state trie node according to claim 1, wherein the predetermined criterion is a criterion for the hash value to be smaller than a hash value that satisfies a predetermined difficulty level.

10. A blockchain system using a state trie node, comprising:

at least one processor; and a memory electrically connected to the processor and storing at least one code executed by the processor, wherein the memory stores code which, when executed by the processor, causes the processor to:

acquire a transaction including state change data for changing the state of a specific account and a state path for a first block including a first trie node relating to specific state data of a blockchain network;

generate a second block including a second trie node based on the transaction and the first trie node; and generate a nonce value of a second node corresponding to a state path from a specific leaf node corresponding to the specific account to a specific root node among one or more second nodes included in the second trie node, and determine whether a hash value derived from the nonce value of the second node and the second node corresponding to the state path satisfies a predetermined criterion, wherein the memory stores code that causes the processor to:

generate a nonce value of a first leaf node included in the one or more second nodes corresponding to the state path, and determine whether a hash value of the first leaf node derived based on the nonce value of the first leaf node and first account information of the first leaf node satisfies the predetermined criterion;

if the hash value of the first leaf node satisfies the predetermined criterion, generate a nonce value of a first parent node associated with the first leaf node, and determine whether a hash value of the first parent node derived based on the nonce value of the first parent node and hash values of one or more child nodes associated with the first parent node satisfies the predetermined criterion;

and if the hash value of the first parent node satisfies the predetermined criterion and a second parent node associated with the first parent node exists, generate a nonce value of the second parent node, and determine whether a hash value of the second parent node derived based on the nonce value of the second parent node and hash values of one or more child nodes associated with the second parent node satisfies the predetermined criterion.

11. The blockchain system using the state trie node according to claim 10, wherein a first node included in the first block and the second node included in the second block each comprises a root node, an intermediate node, or a leaf node, wherein the root node is associated with a child node and either the intermediate node or the leaf node, wherein the intermediate node is associated with the child node and either another intermediate node or the leaf node, wherein the root node and the intermediate node comprise each comprises path data for an associated child node, a nonce field of the root node or the intermediate node into which a nonce value of the root node or the intermediate node is input, and a hash value of the root node or the intermediate node, wherein the leaf node comprises account information including an account, an address, a balance, and a number of transactions, a nonce field of the leaf node into which a nonce value of the leaf node is input, and a hash value of the leaf node, wherein the hash value of the intermediate node is calculated based on the hash value of the one or more child nodes associated according to path data of the intermediate node and the nonce value of the intermediate node input into the nonce field of the intermediate node, wherein the hash value of the root node is calculated based on the hash value of the one or more child nodes associated according to path data of the root node and the nonce value of the root node input into the nonce field of the root node, wherein the hash value of the leaf node is calculated based on the account information and the nonce value input into the nonce field of the leaf node, and wherein the state change data comprises the address and the number of transactions of the specific account.

12. The blockchain system using a state trie node according to claim 11, wherein the memory stores code that causes the processor to transmit the second block to the blockchain network when the hash value of the second node corresponding to the state path satisfies the predetermined criterion.

13. The blockchain system using a state trie node according to claim 12, wherein the memory stores code that causes the processor to:

retrieve a first node corresponding to the state path among the first nodes included in the first trie node, generate a second node corresponding to the state path based on the first node corresponding to the state path using the state change data and the state path, retrieve a sibling node of the second node corresponding to the state path, and associate the retrieved sibling node with the second node corresponding to the state path to generate the second trie node.

14. The blockchain system using a state trie node according to claim 10, wherein the predetermined criterion is a criterion such that the hash value is smaller than a hash value satisfying a predetermined difficulty level.

* * * * *